United States Patent
Kindo (10) Patent No.: US 11,212,469 B2
(45) Date of Patent: Dec. 28, 2021

(54) IMAGE SENSOR

(71) Applicant: Toyota Jidosha Kabushiki Kaisha, Toyota (JP)

(72) Inventor: Toshiki Kindo, Yokohama (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 0 days.

(21) Appl. No.: 16/941,888

(22) Filed: Jul. 29, 2020

(65) Prior Publication Data

US 2021/0044764 A1 Feb. 11, 2021

(30) Foreign Application Priority Data

Aug. 7, 2019 (JP) .............................. JP2019-145685

(51) Int. Cl.
| | | |
|---|---|---|
| *H04N 5/335* | (2011.01) | |
| *H04N 5/351* | (2011.01) | |
| *H04N 5/3745* | (2011.01) | |
| *H04N 5/376* | (2011.01) | |
| *H04N 5/378* | (2011.01) | |

(52) U.S. Cl.
CPC ............ *H04N 5/351* (2013.01); *H04N 5/378* (2013.01); *H04N 5/3765* (2013.01); *H04N 5/37452* (2013.01)

(58) Field of Classification Search
CPC .. H04N 5/351; H04N 5/37452; H04N 5/3765; H04N 5/378; H04N 5/374; H04N 5/355; H04N 5/3745; H04N 5/35581; H04N 5/335
See application file for complete search history.

(56) References Cited

U.S. PATENT DOCUMENTS

| | | | |
|---|---|---|---|
| 10,097,779 B2* | 10/2018 | Park | G06F 11/3058 |
| 2010/0182468 A1 | 7/2010 | Posch et al. | |
| 2019/0197715 A1* | 6/2019 | Rebecq | G06T 15/06 |
| 2020/0098115 A1* | 3/2020 | Fukamachi | G06T 7/38 |

FOREIGN PATENT DOCUMENTS

| | | | |
|---|---|---|---|
| JP | 2007-305061 A | 11/2007 | |
| JP | 2010-510732 A | 4/2010 | |

OTHER PUBLICATIONS

Shigeru Ando, Correlation Image Sensor: Two-Dimensional Matched Detection of Amplitude-Modulated Light, Oct. 2003, IEEE, Entire Document (Year: 2003).*

* cited by examiner

*Primary Examiner* — Kelly L Jerabek
(74) *Attorney, Agent, or Firm* — Dinsmore & Shohl LLP (57) ABSTRACT

An event camera includes an event base sensor configured to detect a luminance change of each pixel as an event and outputs an event signal including the time at which the event is detected and a pixel position at which the event occurs each time the event is detected; a buffer configured to store the event signal output by the event based sensor in a predetermined period that is returned back by a predetermined time from reference time; a storage unit that stores an image; and an update unit that updates the image stored in the storage unit based on the event signal so that the image stored in the storage unit becomes an image at update time included in the predetermined period.

3 Claims, 5 Drawing Sheets

IMAGE SENSOR

CROSS-REFERENCE TO RELATED APPLICATIONS

This application is based on and claims the benefit of priority from Japanese Patent Application No. 2019-145685 filed on Aug. 7, 2019, and the entire contents of which are incorporated herein by reference.

TECHNICAL FIELD

The present disclosure relates to an image sensor.

BACKGROUND

Japanese Unexamined Patent Publication No. 2007-305061 discloses a device for acquiring information on a moving body. This device includes a time correlation image sensor and a processing device. The time correlation image sensor outputs a time correlation between the incident light intensity and a reference signal common to all pixels for each pixel. The time correlation image sensor includes a photodiode detector, a transistor, and a capacitor. The photodiode detector converts incident photons into photocurrent. The transistor generates a current proportional to a product between a photocurrent converted by the photodiode detector and the reference signal common to all pixels by controlling a gate voltage. The capacitor stores the electric charge of the current generated by the transistor. The time correlation image sensor outputs a signal based on the charge stored in the capacitor.

The processing device generates an intensity image and a correlation image at the same timing based on the signal output from the time correlation image sensor. The intensity image is an image showing the incident light intensity for each pixel. The correlation image is an image in which a time correlation between the incident light intensity and the reference signal common to all pixels is generated for each pixel. The processing device calculates an optical flow of the moving body based on the intensity image and the correlation image. As a result, the optical flow of the moving body is obtained without using a plurality of images captured at different times.

SUMMARY

The time correlation image sensor described in Japanese Unexamined Patent Publication No. 2007-305061 may not be able to realize a sufficient dynamic range for a correlation image. For example, as the amount of light detected by a photodiode detector increases, the amount of charge stored in a capacitor also increases. Therefore, the dynamic range of a correlation image depends on the capacity of a capacitor and is limited.

Here, it is conceivable to output a provisional correlation image before the capacity of the capacitor reaches the upper limit thereof. That is, it is conceivable to increase the number of frames per unit time. For example, a time correlation image sensor outputs a provisional correlation image before the capacity of a capacitor reaches the upper limit thereof, and a processing device integrates the plurality of provisional correlation images output over a cycle of a reference signal. As a result, a final correlation image corresponding to the cycle of the reference signal is obtained without depending on the capacity of a capacitor, and thus the limitation of dynamic range due to the upper limit of the capacity of a capacitor is eliminated. However, when the number of frames per unit time increases, the calculation cost increases, and thus it is necessary to prepare high-performance hardware.

The present disclosure provides an image sensor in which the limitation of dynamic range is improved.

One embodiment of the present disclosure is an image sensor. The image sensor includes an event base sensor and a correlation image generation unit. The event base sensor detects a luminance change for each pixel as an event and output an event signal including a detection time at which the event is detected, a pixel position at which the event has occurred, and a change in a pixel value each time the event is detected. The correlation image generation unit is configured to generate a correlation image indicating a correlation between the event signal and a reference signal for each pixel based on the event signal and the reference signal having a predetermined cycle.

In this image sensor, the luminance change for each pixel is detected as an event by the event base sensor. The event signal is output at the timing of event detection. A correlation image is generated based on the event signal and the reference signal having a predetermined cycle. In this manner, not all pixels of the correlation image are generated continuously, but only pixels of the correlation image corresponding to the event are generated (updated). As a result, this image sensor can reduce the calculation cost as compared with a case where all the pixels of the correlation image are generated continuously.

In one embodiment of the present disclosure, the correlation image generation unit may have a buffer configured to store the event signal output by the event base sensor in a predetermined period that is returned back by at least the predetermined cycle from any reference time and a generation unit configured to generate the correlation image based on the event signal stored in the buffer.

In this case, the image sensor can generate a correlation image based on the event signal for a predetermined period stored in the buffer. Since a time correlation image sensor obtains a correlation image by integrating the correlation of a cycle of one frame, the correlation image can be obtained only at the timing matched to the cycle of one frame. On the other hand, in this image sensor, the buffer stores an event signal having a cycle of one frame that is returned back from the reference time. Therefore, this image sensor can output a correlation image at any timing.

In one embodiment of the present disclosure, the correlation image generation unit may have a storage unit configured to store the correlation image and an update time for each pixel, an image update unit configured to update the correlation image and the update time that are stored in the storage unit based on the output event signal, the reference signal, and the correlation image and the update time that are stored in the storage unit each time the event signal is output by the event base sensor, and a readout unit configured to, based on the correlation image and the update time that are stored in the storage unit and any readout time, output the correlation image at the readout time.

In this case, the correlation image stored in the storage unit is updated each time an event occurs, and the update time is stored. By storing the update time, a change in a pixel value included in the event signal can be captured as a change in a pixel value in the elapsed time from the previous event occurrence. Accordingly, this image sensor can hold the latest correlation image. Then, the readout unit obtains a correlation image at the readout time based on the update time. Therefore, this image sensor can output pixels at any readout timing.

According to the present disclosure, an image sensor in which the limitation of dynamic range is improved is provided.

DETAILED DESCRIPTION

Hereinafter, various exemplary embodiments will be described. In the following description, the same reference signs are allotted for the same or corresponding elements, and overlapping description will not be repeated.

First Embodiment (Outline of Time Correlation Image Sensor)

An outline of a general time correlation image sensor will be described. One pixel of an imager of a time correlation image sensor has a configuration in which one photodiode and charge generated from the photodiode are distributed to three capacitors according to an external reference signal. A reference signal is generally a three-phase alternating current. The photocurrent for each pixel, which produces an image, follows Equation (1) below.

$$\left(v \cdot \nabla + \frac{\partial}{\partial t}\right) f(x, y, t) = 0 \quad (1)$$

f (x, y, t) is the brightness of pixel (x, y) at time t, and v is the velocity of pixel (x, y).

An imaging time (shutter release time) for acquiring an image of one frame is set as T, and an image g (x, y) is represented by the following equation (2).

$$g_n(x, y) = \int_0^T f(x, y, t) \cdot e^{-i n \cdot \Delta_\omega \cdot t} dt, \Delta_\omega = \frac{2\pi}{T} \quad (2)$$

As shown in Equation (2), the image has a value obtained by multiplying the brightness f (x, y, t) by a complex reference signal $e^{-in\Delta\omega t}$ to calculate the integral for one frame time. It is assumed that a captured image g (x, y) satisfies following Equation (3).

$$v \cdot \nabla g_n(x,y) + [f(x,y,t)]_0^T + i \cdot n \cdot \Delta_\omega g_n(x,y) = 0, \forall n = 0,1,2 \quad (3)$$

The second term in Equation (3) is an integral boundary value. Since Equation (3) forms a simultaneous equation, the integral boundary value can be eliminated by solving the simultaneous equation using, for example, two images $g_0$ (x, y) and $g_1$ (x, y). The time correlation image sensor can output an intensity image $g_0$ (x, y) constituted of only a real part and a real part and an imaginary part of a complex correlation image $g_n$ (x, y) (Hereinafter, the complex correlation image is also referred to as a time correlation signal). As a result, the velocity v at each pixel, that is, the optical flow, can be obtained by substituting a sensor detection result into the simultaneous equation of Equation (3) and solving it.

In the time correlation image sensor, it is necessary to calculate the integral of one frame time as shown in Equation (2). Therefore, the output timing of the correlation image is limited to one frame time unit. In the time correlation image sensor, the cycle of the reference signal and the release time of the shutter are matched. Therefore, the output of the correlation image is output at the cycle timing of the release time of the shutter.

(Outline of Event Base Sensor)

An outline of a general event base sensor will be described. The event base sensor detects a luminance change within an imaging range and outputs an event signal each time an event is detected. The event base sensor is constituted of, for example, a plurality of image elements arranged in a matrix shape. The event signal is a signal associated with an event. The event is a luminance change of a pixel. The event signal includes, for example, a detection time at which the event has detected, a pixel position at which the event has occurred, and a change in the pixel value. The time at which the event has detected may be measured based on an internal clock (event camera time) of the event base sensor. The criteria for the time at which the event has detected can be reset as necessary. The change in the pixel value is, for example, a change in luminance. The change in the pixel value may be the change amount itself or information indicating whether the luminance change is positive or negative. The event base sensor outputs the event signal only when a luminance change occurs. That is, the event base sensor outputs the event signal asynchronously. Asynchronous output means that output is temporally independently performed in pixel unit without synchronization for all pixels.

The operation of the event base sensor is expressed by following Equation (4).

$$Y(x, y, t) = Y(x, y, t_0) + \Delta Y \sum_i \int_{t_0}^{t} ds \delta(s - s_i) \cdot p(x, y, s_i) \quad (4)$$

Y (x, y, t) is an image at time t. Time $t_0$ is the time at the start of measurement, and the image Y (x, y, $t_0$) is an initial image stored at time $t_0$. Generally, the image Y (x, y, $t_0$) can be set to zero. $\Delta Y$ is a threshold of event occurrence (absolute value of luminance change). p (x, y, $s_i$) is an event signal that has occurred at an i-th pixel (x, y), and p (x, y, $s_i$) is set as p (x, y, $s_i$)=±1.

(Application of Time Correlation Function to Event Base Sensor)

It will be considered whether the event base sensor can be provided with a function of outputting a time correlation signal such as the time correlation image sensor. When the time t is set to the end point of a frame, a signal of a time correlation camera can be expressed as following Equations (5) to (7) with the angular velocity $\omega >= 2\pi/T$.

$$g_0(x,y,t) = \int_{t-T}^{t} f(x,y,s)ds \quad (5)$$

$$\operatorname{Re} g_1(x,y,t) = \int_{t-T}^{t} \cos(\omega(s-t))f(x,y,s)ds \quad (6)$$

$$\operatorname{Im} g_1(x,y,t) = \int_{t-T}^{t} \sin(\omega(s-t))f(x,y,s)ds \quad (7)$$

While a general time correlation camera expresses luminance by storing current from a photodiode in a capacitor, the event base sensor expresses a change in current from a photodiode by quantizing it. Therefore, in the event base sensor, the current from a photodiode at time s can be divided into a term having a constant value during the measurement time and a displacement term therefrom, as shown in following Equation (8).

$$f(x,y,s) = f(x,y,t-T) + \delta f(x,y,s) \quad (8)$$

Considering the properties of the reference signal, following Equations (9) and (10) are established.

$$\int_{t-T}^{t} \cos(\omega \cdot s)ds = 0 \quad (9)$$

$$\int_{t-T}^{t} \sin(\omega \cdot s)ds = 0 \quad (10)$$

When Equations (5) to (7) are rewritten into equations having a constant term and a displacement term with using the relations of Equations (9) and (10), Equations (5) to (7) can be expressed as following Equations (11) to (13).

$$g_0(x,y,t) = Y(x,y,t-T) + \int_{t-T}^{t} \delta f(x,y,s)ds \quad (11)$$

$$\operatorname{Re} g_1(x,y,t) = \int_{t-T}^{t} \cos(\omega(s-t))f(x,y,s)ds \quad (12)$$

$$\operatorname{Im} g_1(x,y,t) = \int_{t-T}^{t} \sin(\omega(s-t))/(x,y,s)ds \quad (13)$$

In the event base sensor, the current of the time correlation camera from the photodiode is replaced with an event signal as shown in Equation (14) below.

$$\delta f(x, y, s) \to \Delta Y \sum_{i} \delta(s - s_i) \cdot p(x, y, s_i) \quad (14)$$

Accordingly, Equations (11) to (13) can be expressed as Equations (15) to (17) below.

$$g_0(x, y, t) = Y(x, y, t - T) + \Delta Y \int_{t-T}^{t} \delta(s - s_i) \cdot p(s, y, s_i)ds \quad (15)$$

$$\operatorname{Re} g_1(x, y, t) = \Delta Y \int_{t-T}^{t} \cos(\omega(s - t)) \sum_{i} \delta(s - s_i) \cdot p(x, y, s_i)ds \quad (16)$$

$$\operatorname{Im} g_1(x, y, t) = \Delta Y \int_{t-T}^{t} \sin(\omega(s - t)) \sum_{i} \delta(s - s_i) \cdot p(x, y, s_i)ds \quad (17)$$

As shown in Equations (15) to (17), the time correlation signal can be output using an event that occurs during the period (cycle T) at which a correlation is acquired.

(Configuration of Image Sensor)

Figure 1:
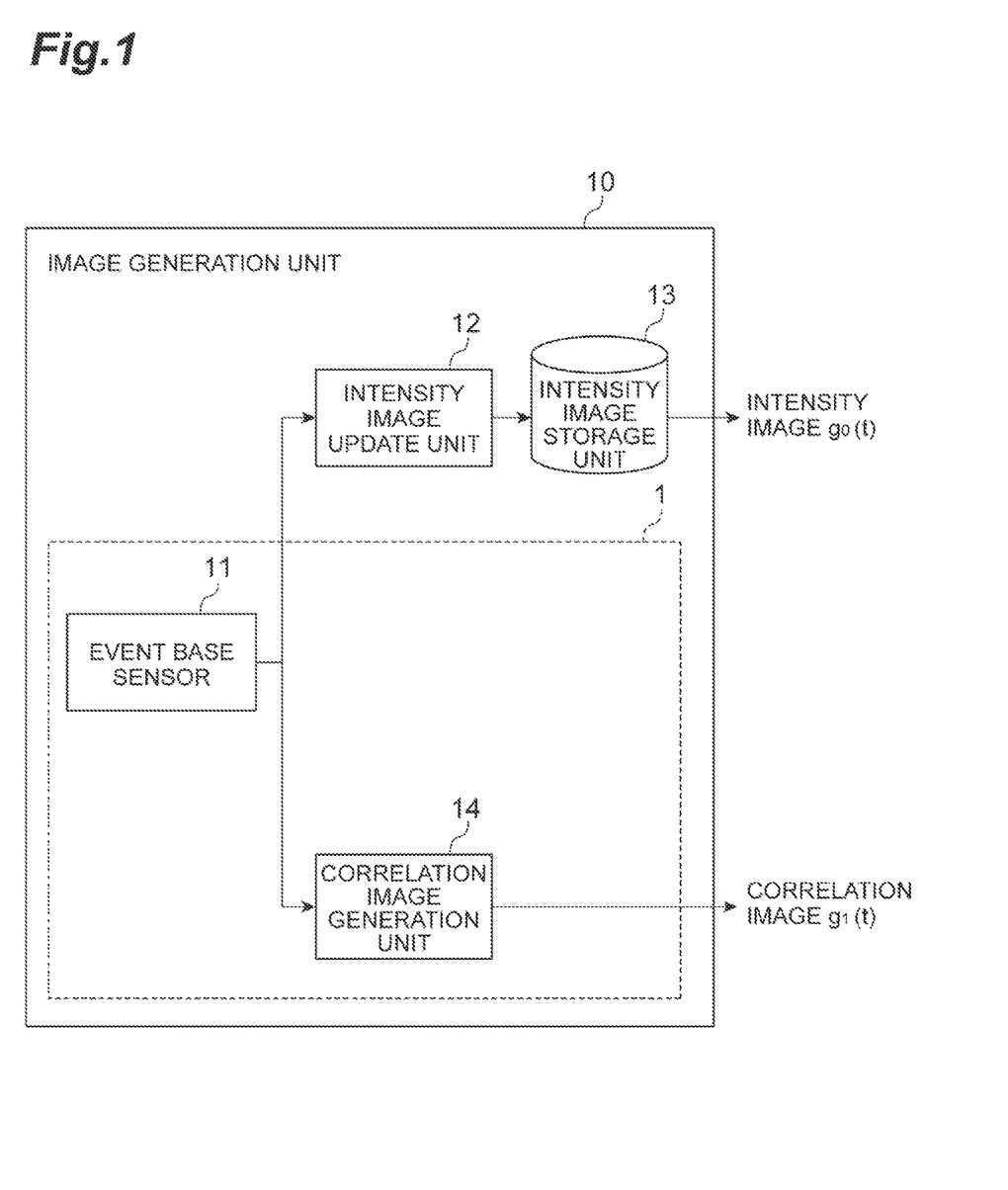
FIG. 1 is a block diagram illustrating an outline of a configuration of an image generation device including an image sensor according to a first embodiment of the present disclosure.

FIG. 1 is a block diagram illustrating an outline of a configuration of an image generation device including an image sensor according to the first embodiment of the present disclosure. An image generation device 10 illustrated in FIG. 1 has a configuration of a general computer including, for example, a central processing unit (CPU), a read only memory (ROM), a random access memory (RAM), and the like. The image generation device 10 includes an event base sensor 11, an intensity image update unit 12, an intensity image storage unit 13, and a correlation image generation unit 14. An image sensor 1 has a configuration including the event base sensor 11 and the correlation image generation unit 14.

As described above, the event base sensor 11 detects a luminance change within an imaging range and asynchronously outputs an event signal. The intensity image storage unit 13 stores an intensity image. The intensity image update unit 12 updates the intensity image stored in the intensity image storage unit 13 based on an event signal output from the event base sensor 11. That is, a function of a general event camera is realized by the event base sensor 11, the intensity image update unit 12, and the intensity image storage unit 13.

The correlation image generation unit 14 is configured to generate a correlation image indicating a correlation between the event signal and a reference signal for each pixel based on the event signal output by the event base sensor 11 and the reference signal having a predetermined cycle. As a specific example, the correlation image generation unit 14 generates a correlation image using Equations (15) to (17) described above.

The image generation device 10 having the configuration described above can output an intensity image $g_0$ (t) and a correlation image $g_1$ (t) that are equivalent to those generated by the time correlation image sensor using the event base sensor 11.

(Summary of First Embodiment)

In the image sensor 1, a luminance change for each pixel is detected as an event by the event base sensor 11. The luminance change corresponds to the capacity change of a capacitor of the time correlation image sensor. Since the image sensor 1 does not need to include a capacitor due to using the event base sensor 11, the limitation of the dynamic range due to the upper limit of the capacity of a capacitor is eliminated. Further, the event signal is output at the timing of event detection, that is, asynchronously. A correlation image is generated based on the asynchronous event signal and the reference signal having a predetermined cycle. In this manner, not all pixels of the correlation image are generated continuously, but only pixels of the correlation image corresponding to the event are generated (updated) asynchronously. As a result, the image sensor 1 can reduce the calculation cost as compared with a case where all the pixels of the correlation image are generated continuously.

Second Embodiment

An image sensor 1A according to the second embodiment of the present disclosure is partially different from the image sensor 1 according to the first embodiment of the present disclosure in the function of the correlation image generation unit but is the same as the image sensor 1 in other respects. In the second embodiment, the description that overlaps with the first embodiment will be omitted, and differences will be mainly described.

Figure 2:
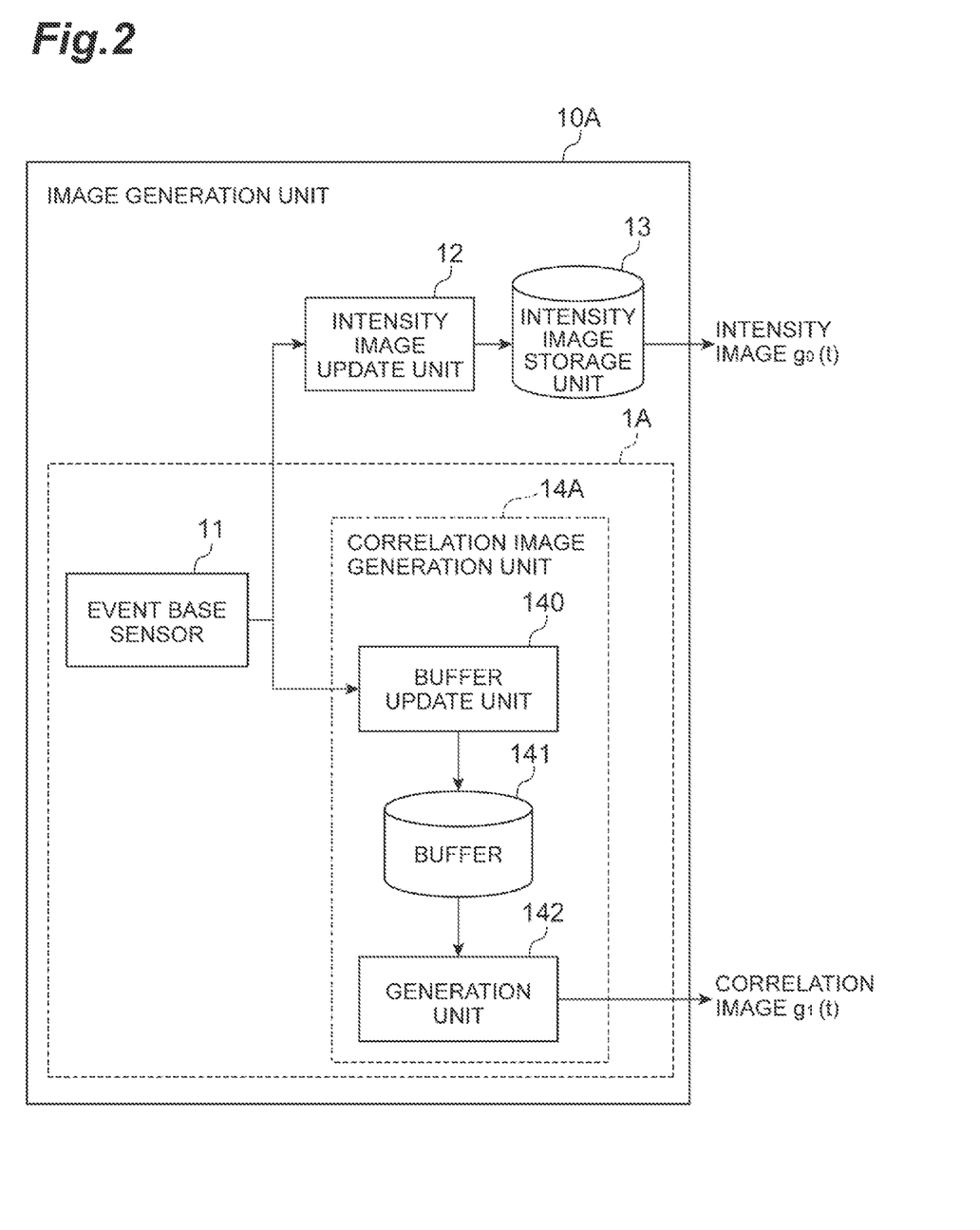
FIG. 2 is a block diagram illustrating an outline of a configuration of an image generation device including an image sensor according to a second embodiment of the present disclosure.

FIG. 2 is a block diagram illustrating an outline of a configuration of an image generation device including an image sensor according to the second embodiment of the present disclosure. As shown in FIG. 2, an image generation device 10A includes an image sensor 1A. The image sensor 1A includes an event base sensor 11 and a correlation image generation unit 14A. The correlation image generation unit 14A includes a buffer update unit 140, a buffer 141, and a generation unit 142.

The buffer 141 stores an event signal output by the event base sensor 11. The buffer update unit 140 updates the buffer 141 so that the event signal stored in the buffer 141 becomes an event signal output by the event base sensor in a predetermined period that is returned back by at least the predetermined cycle from any reference time. The reference time is a predefined time, and is, for example, the present time. The reference time may be a time before or after the present time. The predetermined cycle is a cycle T of the reference signal described above. The buffer update unit 140 stores, for example, an event signal for a predetermined period in the buffer 141 by a first-in last-out method. As a result, the buffer 141 can always hold the latest event signal for the period (cycle T) in which a correlation is acquired.

The generation unit 142 generates a correlation image based on the event signal stored in the buffer 141. As a specific example, the correlation image generation unit 14 generates a correlation image using Equations (15) to (17) described above. Other configuration is the same as that of the image sensor 1 of the first embodiment.

When continuously generating correlation images, the correlation image generation unit 14 may use a mathematical equation formulated in a recurrence equation type in order to reduce the calculation cost of integration. Equations (15) to (17) can be expressed as follows when an elapsed time δt has elapsed from time t.

$$g_0(x, y, t + \delta t) = Y(x, y, t - T + \delta t) + \Delta Y \int_{t-T+\delta t}^{t+\delta t} \delta(s - s_i) \cdot p(s, y, s_i) ds \quad (18)$$

$$\text{Re } g_1(x, y, t + \delta t) = \quad (19)$$
$$\Delta Y \int_{t-T+\delta t}^{t+\delta t} \cos(\omega(s - t - \delta t)) \sum_i \delta(s - s_i) \cdot p(x, y, s_i) ds$$

$$\text{Im } g_1(x, y, t + \delta t) = \quad (20)$$
$$\Delta Y \int_{t-T+\delta t}^{t+\delta t} \sin(\omega(s - t - \delta t)) \sum_i \delta(s - s_i) \cdot p(x, y, s_i) ds$$

By modifying Equations (18) to (20) and assuming that the elapsed time δt is sufficiently smaller than a cycle T in which the correlation is acquired, Recurrence Equation (21) below is obtained.

$$\begin{pmatrix} g_0(x, y, t+\delta t) \\ \text{Re } g_1(x, y, t+\delta t) \\ \text{Im } g_1(x, y, t+\delta t) \\ 1 \end{pmatrix} = \quad (21)$$

$$\begin{pmatrix} 1 & 0 & 0 & \Delta Y^+(x, y, t+\delta t) \\ 0 & \cos(\omega \cdot \delta t) & \sin(\omega \cdot \delta t) & \Delta Y \Delta p(x, y, t+\delta t, T) \\ 0 & -\sin(\omega \cdot \delta t) & \cos(\omega \cdot \delta t) & 0 \\ 0 & 0 & 0 & 1 \end{pmatrix}$$

$$\begin{pmatrix} g_0(x, y, t) \\ \text{Re } g_1(x, y, t) \\ \text{Im } g_1(x, y, t) \\ 1 \end{pmatrix}$$

Recurrence Equation (21) can be applied when the correlation image is updated in a short cycle (δt≪T). By using Recurrence Equation (21), an integration calculation can be simplified to a simple multiplication and addition using the previous values. In this manner, the calculation cost can be reduced.

(Summary of Second Embodiment)

Since the event signal for the period for acquiring a correlation is always held in the buffer 141, the generation unit 142 can generate the correlation image at any timing. As described in the first embodiment, in the time correlation image sensor, the output timing of the correlation image is limited to the cycle timing of the release time of the shutter. Since the image sensor 1A includes the buffer 141, the correlation image can be output at any timing.

Third Embodiment

An image sensor 1B according to the third embodiment of the present disclosure is partially different from the image sensor 1 according to the first embodiment and the image sensor 1A according to the second embodiment of the present disclosure in the function of the correlation image generation unit but is the same as the image sensor 1 in other respects. In the third embodiment, the description that overlaps with the first embodiment and the second embodiment will be omitted, and differences will be mainly described.

The image sensor 1A according to the second embodiment has a configuration in which the correlation image is output at any timing by including the buffer 141. Hereinafter, a method for omitting the buffer 141 will be considered.

The piecewise integration of a function X (s) can be approximated by an integration weighted by an exponential function as follows.

$$\int_{t-T}^{t} X(s) ds \sim \int_{\infty}^{t} e^{(s-t)/T} X(s) ds$$

By applying the above equation and approximating the piecewise integration of a time correlation signal by the integration weighted by the exponential function, the calculation limited to time t−T in the integration section can be eliminated. Specifically, Equations (15) to (17) can be simplified as follows.

$$g_0(x, y, t) = Y(x, y, t - T) + \Delta Y \int_{t-T}^{t} \delta(s - s_i) \cdot p(s, y, s_i) ds = Y(x, y, t) \quad (22)$$

$$\text{Re } g_1(x, y, t) = \Delta Y \int_{\infty}^{t} e^{(s-t)/T} \cos(\omega(s - t)) \sum_i \delta(s - s_i) \cdot p(x, y, s_i) ds \quad (23)$$

$$\text{Im } g_1(x, y, t) = \Delta Y \int_{\infty}^{t} e^{(s-t)/T} \sin(\omega(s - t)) \sum_i \delta(s - s_i) \cdot p(x, y, s_i) ds \quad (24)$$

Further, when Equations (22) to (24) are rewritten as Recurrence Equation (21) described in the second embodiment, Recurrence Equation (25) is obtained as follows.

$$\begin{pmatrix} g_0(x, y, t+\delta t) \\ \text{Re } g_1(x, y, t+\delta t) \\ \text{Im } g_1(x, y, t+\delta t) \\ 1 \end{pmatrix} = \quad (25)$$

$$\begin{pmatrix} 1 & 0 & 0 & \Delta Y^+(x, y, t+\delta t) \\ 0 & e^{-\delta t/T}\cos(\omega \cdot \delta t) & e^{-\delta t/T}\sin(\omega \cdot \delta t) & \Delta Y \Delta p(x, y, t+\delta t, T) \\ 0 & -e^{-\delta t/T}\sin(\omega \cdot \delta t) & e^{-\delta t/T}\cos(\omega \cdot \delta t) & 0 \\ 0 & 0 & 0 & 1 \end{pmatrix}$$

-continued $$\begin{pmatrix} g_0(x, y, t) \\ \text{Re } g_1(x, y, t) \\ \text{Im } g_1(x, y, t) \\ 1 \end{pmatrix}$$

The time correlation signal $g_1$ (x, y) is updated using Recurrence Equation (25) each time an event signal is output from the event base sensor 11. When assuming that the previous event occurrence time is $s_m$ (x, y), the elapsed time δt in Recurrence Equation (25) is expressed as t−$s_m$ (s, y). In the following description, it is assumed that there is no time lag among the event occurrence time, the reception time of the event signal, and the update time of the correlation image, and they are all at the same timing. By substituting the event signal, the previous time correlation signal, the previous event occurrence time $s_m$ (x, y), and the cycle T of the reference signal into Recurrence Equation (25), a present time correlation signal can be obtained. As a result, the latest time correlation signal is always obtained, and thus there is no need to hold the event signal for the cycle T. Therefore, the buffer 141 for recording an event signal can be omitted.

The readout of a correlation image can be performed independently of updating (storing) the correlation image. It is assumed that τ is the elapsed time from the previous event occurrence time $s_m$ (x, y) to the time t at which the readout command has been received. The time correlation signal $g_1$ (x, y) at the time of receiving the previous event signal is corrected according to following Equations (26) and (27), and is output as a correlation image.

$$\text{Re } g_1(x,y) \leftarrow e^{-\tau/T} \text{ Re } e^{-i\omega\tau}g_1(x,y) \qquad (26)$$

$$\text{Im } g_1(x,y) \leftarrow e^{-\tau/T} \text{ Im } e^{-i\omega\tau}g_1(x,y) \qquad (27)$$

In this manner, a time correlation signal can be obtained at any timing.

(Configuration of Image Sensor)

Figure 3:
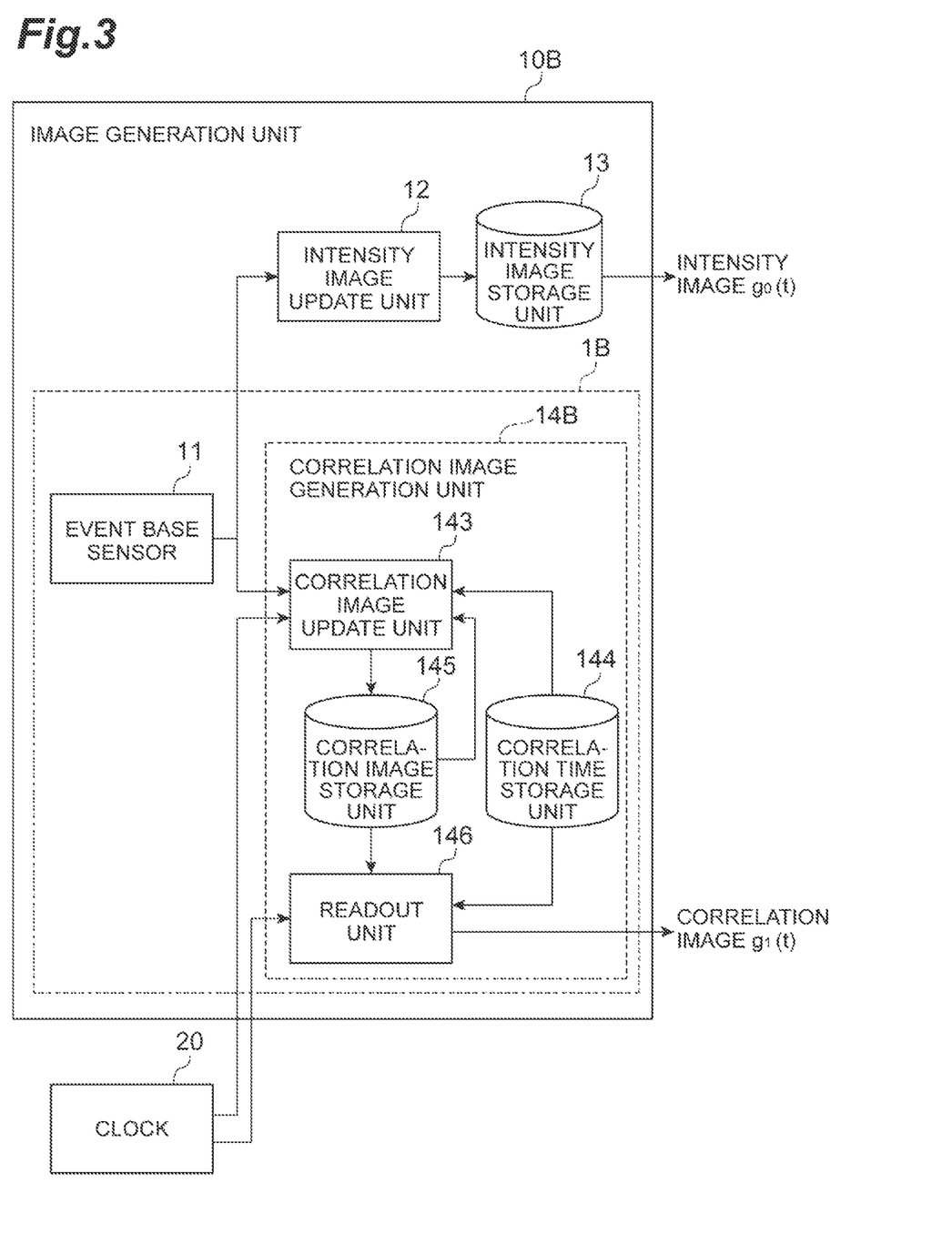
FIG. 3 is a block diagram illustrating an outline of a configuration of an image generation device including an image sensor according to a third embodiment of the present disclosure.

FIG. 3 is a block diagram illustrating an outline of a configuration of an image generation device including an image sensor according to the third embodiment of the present disclosure. As shown in FIG. 3, the image sensor 1B includes an event base sensor 11 and a correlation image generation unit 14B. The correlation image generation unit 14B includes a correlation image update unit 143 (an example of an image update unit), a correlation time storage unit 144, a correlation image storage unit 145 (an example of a storage unit), and a readout unit 146.

The correlation time storage unit 144 stores the cycle T of the reference signal. The correlation image storage unit 145 stores the correlation image $g_1$ (x, y) and the update time (here, the same time as the event occurrence time $s_m$ (x, y)) for each pixel. That is, the correlation image storage unit 145 stores a correlation for each pixel and the update time. The correlation image update unit 143 updates the correlation image storage unit 145 each time an event signal is output from the event base sensor 11. Updating of data is not limited to a partial correction or overwriting of data and may include a case where the index of data is changed (a case where new data is written to other storage area without deleting previous data). The correlation image update unit 143 determines an update time based on a signal from a clock 20 in order to perform synchronization with the readout unit 146.

The correlation image update unit 143 updates the correlation image stored in the correlation image storage unit 145 and the update time based on the event signal output from the event base sensor 11, the reference signal, the correlation image stored in the correlation image storage unit 145, and the update time. Specifically, the correlation image update unit 143 substitutes the event signal output from the event base sensor 11 and the previous time correlation signal $g_1$ (x, y) stored in the correlation image storage unit 145, the update time (previous event occurrence time $s_m$ (x, y)), and the cycle T stored in the correlation time storage unit 144 into Recurrence Equation (25) described above, and obtains the present time correlation signal $g_1$ (x, y). The correlation image update unit 143 updates the correlation image stored in the correlation image storage unit 145 and the update time using the present time correlation signal $g_1$ (x, y) and the present time.

The readout unit 146 outputs a correlation image at the readout time based on the correlation image stored in the correlation image storage unit 145 and the update time and any readout time. The readout unit 146 calculates the elapsed time τ from the update time (previous event occurrence time $s_m$ (x, y)) stored in the correlation image storage unit 145 to the readout time t at which the readout command has been received. Then, using the elapsed time τ and the cycle T stored in the correlation time storage unit 144, the readout unit 146 corrects the time correlation signal $g_1$ (x, y) at the time of receiving the previous event signal according to the above-described Equations (26) and (27). The readout unit 146 determines an update time based on a signal from the clock 20 in order to perform synchronization with the correlation image update unit 143.

(Operation of Update Unit)

Figure 4:
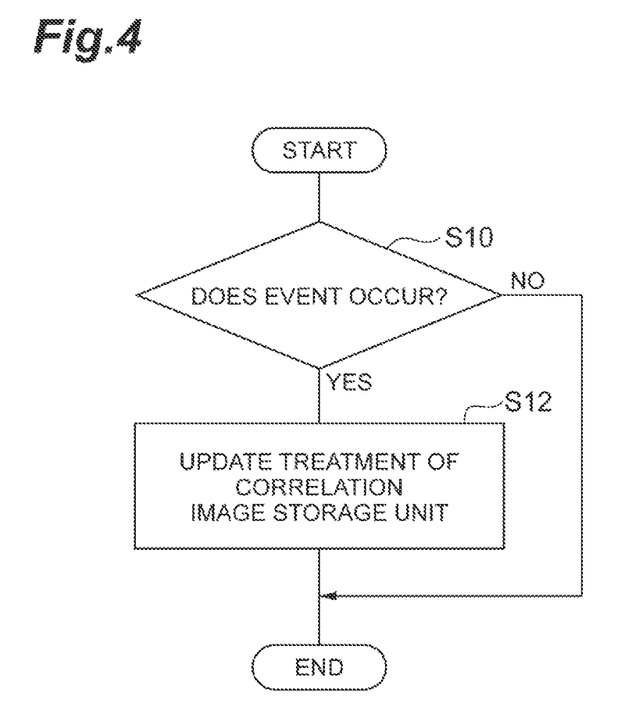
FIG. 4 is a flowchart illustrating an update operation of a correlation image storage unit.

FIG. 4 is a flowchart illustrating an update operation of a correlation image storage unit. The flowchart illustrated in FIG. 4 is executed by the correlation image update unit 143 at the timing at which an image acquisition instruction is instructed to an image generation device 10B.

As shown in FIG. 4, first, it is determined whether an event has occurred (Step S10) or not. If it is determined in Step S10 that an event has occurred, the process proceeds to a process of updating the correlation image storage unit (Step S12). In Step S12, the correlation image stored in the correlation image storage unit 145 and the update time are updated. When Step S12 ends, the flowchart shown in FIG. 4 ends.

Figure 5:
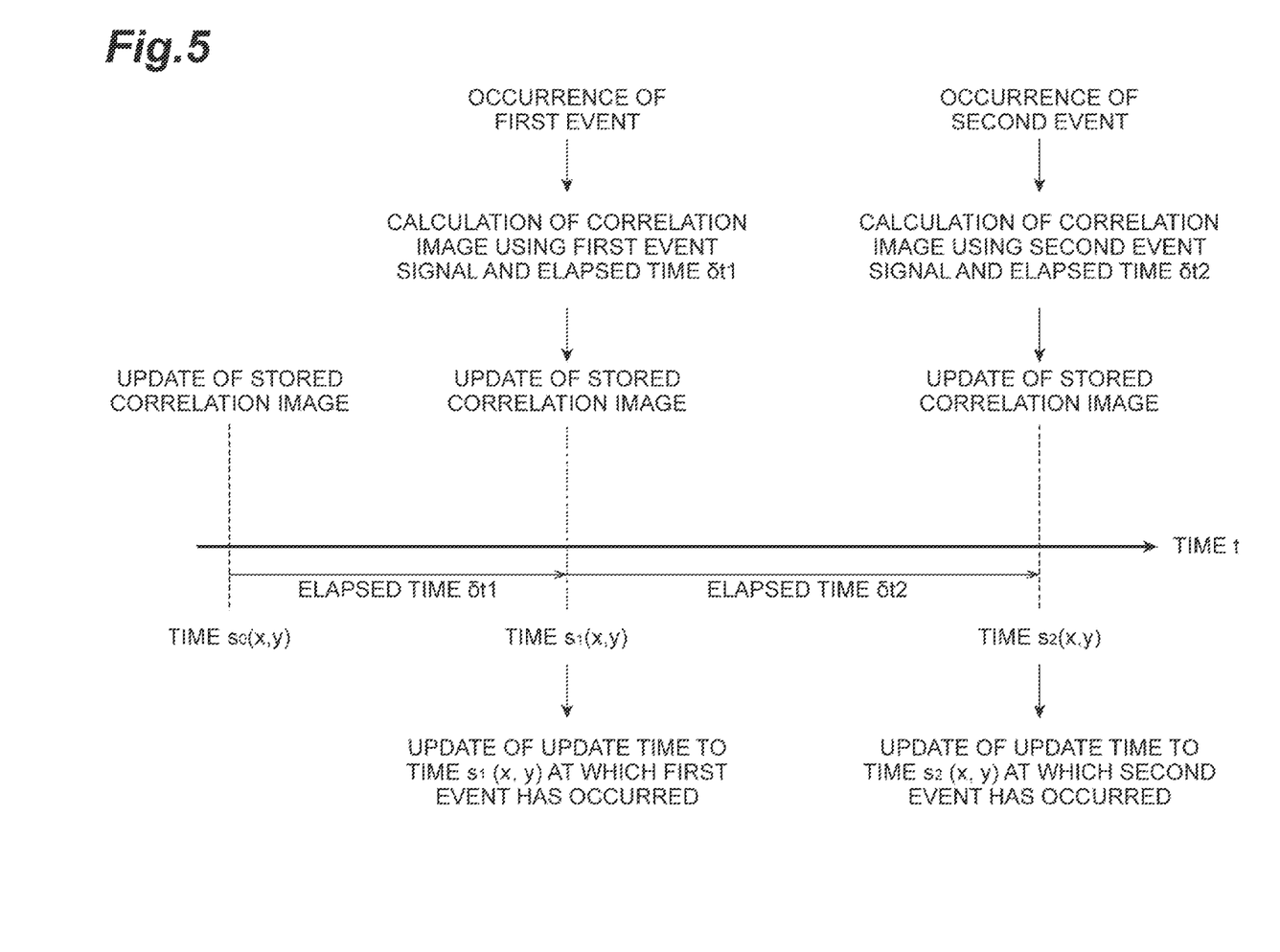
FIG. 5 is a time chart describing an update operation of a correlation image storage unit.

FIG. 5 is a time chart describing an update operation of a correlation image storage unit. As shown in FIG. 5, it is assumed that a stored correlation image is updated at time $s_0$ (x, y), and then a first event occurs at time $s_1$ (x, y). In this case, the correlation image update unit 143 calculates the elapsed time δt1 from the update time (time $s_0$ (x, y)) stored in the correlation image storage unit 145 to time $s_1$ (x, y). Then, the correlation image update unit 143 calculates a correlation image using the previous correlation image, a first event signal, and the elapsed time δt1, and updates the correlation image stored in the correlation image storage unit 145. Then, the correlation image update unit 143 changes the update time stored in the correlation image storage unit 145 to time $s_1$ (x, y). Thereafter, it is assumed that a second event occurs at time $s_2$ (x, y). In this case, the correlation image update unit 143 calculates the elapsed time δt2 from the update time (time $s_1$ (x, y)) stored in the correlation image storage unit 145 to time $s_2$ (x, y). Then, the correlation image update unit 143 calculates a correlation image using the previous correlation image, a second event signal, and the elapsed time δt2, and updates the correlation image stored in the correlation image storage unit 145. Then, the correlation image update unit 143 changes the update time stored in the correlation image storage unit 145 to time $s_2$ (x, y). In this manner, the data stored in the correlation image storage unit 145 is updated each time an event occurs.

(Summary of Third Embodiment)

The correlation image stored in the correlation image storage unit 145 is updated each time an event occurs, and the update time is stored. By storing the update time, a change in a pixel value included in the event signal can be captured as a change in a pixel value in the elapsed time from the previous event occurrence. Accordingly, this image sensor 1B can hold the latest correlation image. Then, the readout unit 146 obtains a correlation image at the readout time based on the update time. Therefore, this image sensor 1B can output pixels at any timing.

The present disclosure is not limited to the above embodiments. The present disclosure can be variously modified without departing from the gist thereof.

A function realized by an arithmetic device such as a CPU which executes a program may be realized by a logic circuit or the like. In the present embodiments, the output of the event base sensor is described as a luminance signal. However, in the event base sensor according to the above-described embodiments, an appropriate color filter may be added to each pixel to be functioned as a color event base sensor.

What is claimed is:

1. An image sensor comprising:
    an event base sensor configured to detect a luminance change for each pixel as an event and output an event signal including a detection time at which the event is detected, a pixel position at which the event occurs, and a change in a pixel value each time the event is detected; and
    a correlation image generation unit configured to, based on the event signal and a reference signal having a predetermined cycle, generate a correlation image indicating a correlation between the event signal and the reference signal for each pixel.

2. The image sensor according to claim 1, wherein the correlation image generation unit includes:
    a buffer configured to store the event signal output by the event base sensor in a predetermined period that is returned back by at least the predetermined cycle from any reference time; and
    a generation unit configured to generate the correlation image based on the event signal stored in the buffer.

3. The image sensor according to claim 1, wherein the correlation image generation unit includes:
    a storage unit configured to store the correlation image and an update time for each pixel;
    an image update unit configured to update the correlation image and the update time that are stored in the storage unit based on the output event signal, the reference signal, and the correlation image and the update time that are stored in the storage unit each time the event signal is output by the event base sensor; and
    a readout unit configured to, based on the correlation image and the update time that are stored in the storage unit and any readout time, output the correlation image at the readout time.

* * * * *